(12) United States Patent
Nakayama et al.

(10) Patent No.: US 8,816,017 B2
(45) Date of Patent: *Aug. 26, 2014

(54) PROCESS FOR PRODUCING POLYAMIC ACID SOLUTION AND POLYAMIC ACID SOLUTION

(75) Inventors: Takeshige Nakayama, Ube (JP); Seiichirou Takabayashi, Ube (JP); Tooru Murakami, Ube (JP)

(73) Assignee: UBE Industries, Ltd., Ube-Shi (JP)

( * ) Notice: Subject to any disclaimer, the term of this patent is extended or adjusted under 35 U.S.C. 154(b) by 398 days.

This patent is subject to a terminal disclaimer.

(21) Appl. No.: 12/745,217

(22) PCT Filed: Dec. 1, 2008

(86) PCT No.: PCT/JP2008/071778
§ 371 (c)(1),
(2), (4) Date: Jul. 21, 2010

(87) PCT Pub. No.: WO2009/069797
PCT Pub. Date: Jun. 4, 2009

(65) Prior Publication Data
US 2010/0305295 A1    Dec. 2, 2010

(30) Foreign Application Priority Data
Nov. 29, 2007 (JP) .................. 2007-308640

(51) Int. Cl.
*C08L 79/08* (2006.01)
*C08G 73/10* (2006.01)

(52) U.S. Cl.
USPC .................. 525/432; 524/845; 528/353

(58) Field of Classification Search
CPC ................. C08G 73/1028–73/1032
USPC ......................... 525/432; 528/353
See application file for complete search history.

(56) References Cited

U.S. PATENT DOCUMENTS 4,290,936 A   9/1981  Sasaki et al.
4,535,105 A   8/1985  Inaike et al.

FOREIGN PATENT DOCUMENTS

| JP | A-S56-38324 | 4/1981 |
| JP | A-S57-131248 | 8/1982 |
| JP | A-S59-164328 | 9/1984 |
| JP | A-S59-204619 | 11/1984 |
| JP | A-S61-258836 | 11/1986 |
| JP | 6215887 A * | 5/1987 |
| JP | A-S62-115887 | 5/1987 |
| JP | A-H07-300524 | 11/1995 |
| JP | A-H11-80352 | 3/1999 |
| WO | WO 2008/059801 A1 | 5/2008 |

OTHER PUBLICATIONS

International Search Report issued in corresponding PCT Application No. PCT/JP2008/071778, mailed Jan. 20, 2009.
International Preliminary Report on Patentability and Written Opinion corresponding to PCT Application No. PCT/JP2008/071778, mailed Jun. 17, 2010.
Office Action issued in corresponding Chinese Patent Application No. 200880125661X on Jan. 6, 2012.
Office Action issued on Apr. 17, 2013 for Japanese Patent Application No. 2007-294691.

* cited by examiner

*Primary Examiner* — Randy Gulakowski
*Assistant Examiner* — Rachel Kahn
(74) *Attorney, Agent, or Firm* — Knobbe Martens Olson & Bear LLP

(57) ABSTRACT

Disclosed is a process for producing a polyamic acid solution by reacting a diamine component consisting essentially of 20 mol % to 80 mol % of p-phenylenediamine and 80 mol % to 20 mol % of diaminodiphenyl ether with a tetracarboxylic acid component consisting essentially of 10 mol % to 60 mol % of 2,3,3',4'-biphenyltetracarboxylic dianhydride and 90 mol % to 40 mol % of 3,3',4,4'-biphenyltetracarboxylic dianhydride in a solvent, comprising:

a first step in which a diamine component is reacted with a molar excess of a tetracarboxylic acid component in a solvent containing more than ⅓ mole of water per mole of the tetracarboxylic acid component, whereby preparing a polyamic acid solution; and a second step in which a diamine component, or a diamine component and a tetracarboxylic acid component are added to the polyamic acid solution obtained in the first step so that the molar amount of the diamine component is substantially equal to the molar amount of the tetracarboxylic acid component, and then the diamine component and the tetracarboxylic acid component are reacted.

5 Claims, No Drawings

PROCESS FOR PRODUCING POLYAMIC ACID SOLUTION AND POLYAMIC ACID SOLUTION

This application is the U.S. National Phase under 35 U.S.C. §371 of International Application PCT/JP2008/071778, filed Dec. 1, 2008 designating the U.S., and published in Japanese as WO2009/069797 on Jun. 4, 2009, which claims priority to Japanese Patent Application No. 2007-308640, filed Nov. 29, 2007.

TECHNICAL FIELD

The present invention relates to a novel process for producing a polyamic acid solution which is a polyimide precursor solution. A solution of a polyamic acid prepared from the specific combination of amine component and tetracarboxylic acid component, which has a high concentration and a low viscosity, may be reliably produced by the production process. Although the polyamic acid solution has a lower molecular weight of the polyamic acid and a higher concentration, it may have excellent solution stability and film-forming properties, and a polyimide film having excellent mechanical properties may be easily prepared from the polyamic acid solution.

BACKGROUND ART

A polyamic acid solution is used in various applications as a polyimide precursor solution. In general, a polyamic acid solution may be suitably prepared by reacting substantially equimolar amounts of a diamine and a tetracarboxylic dianhydride in a solvent at a low temperature for suppressing an excessive imidization reaction. However, it is difficult to produce a polyamic acid solution having a high concentration by this process because a polyamic acid is readily polymerized, leading to higher viscosity of the solution.

Patent Document 1 discloses a process for producing a polyamic acid solution composition in which substantially equimolar amounts of a biphenyltetracarboxylic dianhydride and an aromatic diamine are reacted at a reaction temperature of 100° C. or lower in an organic polar solvent containing about 0.5 mole to about 40 mole of water per mole of the biphenyltetracarboxylic dianhydride to give a homogeneous reaction solution, and then free water is removed from the reaction solution to lower the content of free water in the reaction solution as measured by nuclear magnetic resonance spectrometry to 0.5 wt % or less. However, because the reaction of an acid anhydride group and an amino group and the reaction of an acid anhydride group and water proceed competitively in this process, it is difficult to control the reaction, and therefore it is not easy to control a molecular weight of a polyamic acid obtained reproducibly and reliably. Furthermore, in Examples of Patent Document 1, with regard to low molecular weight of the polyamic acid, the polyamic acid solution having a polyamic acid logarithmic viscosity of 0.43 was obtained (Example 13). With regard to high concentration of the polyamic acid solution, the polyamic acid solution having a polymer concentration of 26.0 wt % was obtained (Example 9). Nevertheless, it is still difficult to produce a polyamic acid solution having a higher concentration and a lower molecular weight of the polyamic acid. In addition, water must be removed from the reaction solution after the completion of the reaction in this process, which requires a complicated step.

Patent Documents 2 and 3 disclose a process for producing a polyamic acid solution by polymerizing a tetracarboxylic acid component and a diamine component, for example, by polymerizing substantially equimolar amounts of an acid component and an amine component in an organic polar solvent containing a small amount of water, or alternatively, by reacting an amine component with a molar excess of an acid component to prepare an intermediate such as an oligomer, and then adding an amine component thereto so that the molar amount of the amine component is substantially equal to the molar amount of the acid component, followed by further reacting them to prepare a polyamic acid. However, Patent Documents 2 and 3 merely teach that the amount of water contained in the solvent is about 10 wt % or less. Patent Documents 2 and 3 do not present Example in which a polyamic acid solution is produced by reacting an amine component with a molar excess of an acid component, and then adding an amine component thereto so that the molar amount of the amine component is substantially equal to the molar amount of the acid component, followed by further reacting them. In Comparative Example 6 of Patent Document 3, a polyamic acid solution having a polyamic acid logarithmic viscosity of 0.39 was obtained, but the polyamic acid solution had a polymer concentration of 22.3 wt %. Thus, there is the need for a polyamic acid solution having a higher concentration and a lower molecular weight of the polyamic acid. In addition, the polyamic acid solution of Comparative Example 6 of Patent Document 3 did not have adequate solution stability.

Patent Document 1: Japanese Laid-open Patent Publication No. 1982-131248.

Patent Document 2: Japanese Laid-open Patent Publication No. 1984-164328.

Patent Document 3: Japanese Laid-open Patent Publication No. 1984-204619.

DISCLOSURE OF THE INVENTION

Problems to be Solved by the Invention

A polyamic acid solution having a higher concentration and a lower molecular weight of the polyamic acid may have inadequate solution stability. In addition, the polyamic acid solution may not have good film-forming properties, and powdering and foaming may occur when producing a polyimide film. It is not easy to reliably produce a polyimide film having excellent mechanical properties. Thus, there is the need for a polyamic acid solution which has a higher concentration and a lower molecular weight of the polyamic acid, and exhibits excellent solution stability and film-forming properties, and from which a polyimide film having excellent mechanical properties may be reliably produced.

Accordingly, an objective of the present invention is to provide a novel process for reproducibly and reliably producing a polyamic acid solution having a high concentration and a low viscosity, by controlling the molecular weight of the polyamic acid, which is prepared from the specific combination of diamine component and tetracarboxylic acid component, to a predetermined low level. Another objective of the present invention is to provide a novel polyamic acid solution having a logarithmic viscosity of 0.35 or lower in which the molecular weight of the polyamic acid is suitably controlled to a desired low level. The solution of a polyamic acid prepared from the specific combination of diamine component and tetracarboxylic acid component may have a high concentration and a low viscosity, and exhibit excellent solution stability and film-forming properties. A polyimide film having excellent mechanical properties may be easily prepared from the polyamic acid solution.

Means for Solving the Problems

The present invention relates to the followings.

[1] A process for producing a polyamic acid solution by reacting a diamine component consisting essentially of 20 mol % to 80 mol % of p-phenylenediamine and 80 mol % to 20 mol % of diaminodiphenyl ether with a tetracarboxylic acid component consisting essentially of 10 mol % to 60 mol % of 2,3,3',4'-biphenyltetracarboxylic dianhydride and 90 mol % to 40 mol % of 3,3',4,4'-biphenyltetracarboxylic dianhydride in a solvent, comprising:

a first step in which a diamine component is reacted with a molar excess of a tetracarboxylic acid component in a solvent containing more than ⅓ mole of water per mole of the tetracarboxylic acid component, whereby preparing a polyamic acid solution; and a second step in which a diamine component, or a diamine component and a tetracarboxylic acid component are added to the polyamic acid solution obtained in the first step so that the molar amount of the diamine component is substantially equal to the molar amount of the tetracarboxylic acid component, and then the diamine component and the tetracarboxylic acid component are reacted.

[2] The process for producing a polyamic acid solution as described in [1], wherein in the first step, the molar ratio of the tetracarboxylic acid component to the diamine component (tetracarboxylic acid component/diamine component) is 1.2 or more.

[3] The process for producing a polyamic acid solution as described in any one of [1] to [2], wherein in the first step, the content of water in the solvent used is within a range of 0.05 wt % to 2 wt %.

[4] The process for producing a polyamic acid solution as described in any one of [1] to [3], wherein the polyamic acid solution obtained in the second step has a polyamic acid logarithmic viscosity of 0.35 or lower.

[5] The process for producing a polyamic acid solution as described in any one of [1] to [4], wherein the polyamic acid solution obtained has a water content of 1 wt % or less.

[6] The process for producing a polyamic acid solution as described in any one of [1] to [5], wherein the polyamic acid solution obtained has a solid content concentration of 25 wt % to 50 wt % and a solution viscosity at 30° C. of 50 Pa·sec or lower.

[7] The process for producing a polyamic acid solution as described in any one of [1] to [6], wherein the amount of the tetracarboxylic acid component to be reacted in the first step is within a range of 10 mol % to 70 mol % based on the total amount of the tetracarboxylic acid component to be reacted in the first step and the second step.

[8] A polyamic acid solution prepared by reacting a diamine component consisting essentially of 20 mol % to 80 mol % of p-phenylenediamine and 80 mol % to 20 mol % of diaminodiphenyl ether with a tetracarboxylic acid component consisting essentially of 10 mol % to 60 mol % of 2,3,3',4'-biphenyltetracarboxylic dianhydride and 90 mol % to 40 mol % of 3,3',4,4'-biphenyltetracarboxylic dianhydride in a solvent, wherein the molar amount of the diamine component is substantially equal to the molar amount of the tetracarboxylic acid component, and the polyamic acid solution has a logarithmic viscosity of 0.35 or lower.

[9] The polyamic acid solution as described in [8], wherein the polyamic acid solution has a water content of 1 wt % or less.

[10] The polyamic acid solution as described in any one of [8] to [9], wherein the polyamic acid solution has a solid content concentration of 25 wt % to 50 wt % and a solution viscosity at 30° C. of 50 Pa·sec or lower.

Effect of the Invention

A polyamic acid solution having a high concentration and a low viscosity wherein the molecular weight of the polyamic acid, which is prepared from the specific combination of diamine component and tetracarboxylic acid component, is controlled to a predetermined low level may be reproducibly and reliably produced by the novel production process of the present invention. Furthermore, according to the present invention, there can be provided a novel polyamic acid solution having a polyamic acid logarithmic viscosity of 0.35 or lower. The solution of a polyamic acid prepared from the specific combination of diamine component and tetracarboxylic acid component may have a high concentration and a low viscosity, and exhibit excellent solution stability and film-forming properties. A polyimide film having excellent mechanical properties may be easily prepared from the polyamic acid solution.

BEST MODE FOR CARRYING OUT THE INVENTION

The process for producing a polyamic acid solution of the present invention is a process for producing a polyamic acid solution by reacting a diamine component consisting essentially of 20 mol % to 80 mol % of p-phenylenediamine and 80 mol % to 20 mol % of diaminodiphenyl ether with a tetracarboxylic acid component consisting essentially of 10 mol % to 60 mol % of 2,3,3',4'-biphenyltetracarboxylic dianhydride and 90 mol % to 40 mol % of 3,3',4,4'-biphenyltetracarboxylic dianhydride in a solvent, in which a diamine component is reacted with a molar excess of a tetracarboxylic acid component in a solvent containing more than ⅓ mole of water per mole of the tetracarboxylic acid component to prepare a polyamic acid solution as a first step, and then a diamine component, or a diamine component and a tetracarboxylic acid component are added to the polyamic acid solution thus obtained so that the molar amount of the diamine component is substantially equal to the molar amount of the tetracarboxylic acid component, and subsequently, the diamine component and the tetracarboxylic acid component are reacted as a second step.

The "poly"amic acid of the present invention has a very low molecular weight and is not necessarily a polymer. The term "polyamic acid" as used herein means a polyimide precursor including a component having an amic acid structure, which may include starting components such as an amic acid oligomer, a low-molecular-weight amic acid compound, for example, a compound formed by reacting one molecule of a diamine with one or two molecules of a tetracarboxylic dianhydride, a tetracarboxylic acid formed by the hydrolysis of the tetracarboxylic dianhydride, and the like.

In the present invention, a diamine component consists essentially of 20 mol % to 80 mol % of p-phenylenediamine and 80 mol % to 20 mol % of diaminodiphenyl ether, preferably 30 mol % to 70 mol % of p-phenylenediamine and 70 mol % to 30 mol % of diaminodiphenyl ether. When a diamine component comprises less than 20 mol % of p-phenylenediamine based on the total molar amount of the diamine component, a polyimide film having adequate mechanical properties may not always be produced from the polyamic acid solution obtained. When a diamine component comprises more than 80 mol % of p-phenylenediamine based on the total molar amount of the diamine component, powdering and foaming may readily occur when producing a polyimide film from the polyamic acid solution obtained, and a polyimide film having a surface in good condition may not be easily produced.

In the present invention, a tetracarboxylic acid component consists essentially of 10 mol % to 60 mol % of 2,3,3',4'-biphenyltetracarboxylic dianhydride and 90 mol % to 40 mol % of 3,3',4,4'-biphenyltetracarboxylic dianhydride, preferably 15 mol % to 50 mol % of 2,3,3',4'-biphenyltetracarboxylic dianhydride and 85 mol % to 50 mol % of 3,3',4,4'-biphenyltetracarboxylic dianhydride. When a tetracarboxylic acid component comprises less than 10 mol % of 2,3,3',4'-biphenyltetracarboxylic dianhydride based on the total molar amount of the tetracarboxylic acid component, powdering and foaming may readily occur when producing a polyimide film from the polyamic acid solution obtained, and a polyimide film having a surface in good condition may not be easily produced. When a tetracarboxylic acid component comprises more than 60 mol % of 2,3,3',4'-biphenyltetracarboxylic dianhydride based on the total molar amount of the tetracarboxylic acid component, a polyimide film having adequate mechanical properties may not always be produced from the polyamic acid solution obtained.

A preferable solvent may be an organic polar solvent which has a boiling point of 300° C. or lower at atmospheric pressure and the polyamic acid is soluble in. Examples of the solvent may include solvents having a nitrogen atom in the molecule such as N,N-dimethylacetamide, N,N-diethylacetamide, N, N-dimethylformamide, N, N-diethylformamide, N-methyl-2-pyrrolidone, 1,3-dimethyl-2-imidazolidinone, and N-methylcaprolactam; solvents having a sulfur atom in the molecule such as dimethyl sulfoxide, diethyl sulfoxide, dimethyl sulfone, diethyl sulfone, and hexamethyl sulfolamide; solvents which are phenols such as cresol, phenol, and xylenol; solvents having an oxygen atom in the molecule such as diethylene glycol dimethyl ether (diglyme), triethylene glycol dimethyl ether (triglyme), and tetraglyme; and other solvents such as acetone, dimethylimidazoline, methanol, ethanol, ethylene glycol, dioxane, tetrahydrofuran, pyridine, and tetramethylurea.

In the first step in the process for producing a polyamic acid solution of the present invention, a diamine component is reacted with a molar excess of a tetracarboxylic acid component in a solvent containing more than ⅓ mole of water per mole of the tetracarboxylic acid component to prepare a polyamic acid solution. A polyamic acid formed in this step mostly has a molecular weight depending on the molar ratio of the tetracarboxylic acid component to the diamine component, which is a low molecular weight. The polyamic acid generally has tetracarboxylic dianhydride components at both its molecular terminal, and an acid anhydride group, which is derived from the tetracarboxylic dianhydride and located at its molecular terminal, and is not involved in the amic acid bond, is hydrolyzed by the action of water present in the solvent to be two carboxyl groups. When the amount of water is insufficient, it may be difficult to prepare a polyamic acid having a low molecular weight, because many acid anhydride groups remain unhydrolyzed and react with a diamine added in the second step to form a polyamic acid having a high molecular weight. Furthermore, when the amount of water is insufficient, a polyamic acid may be polymerized and the viscosity of the solution may become higher. In such cases, some of tetracarboxylic dianhydride component added in the second step may not be dissolved in the solution, and therefore a homogeneous polyamic acid solution may not be prepared.

In the first step, it is preferable to use a solvent containing water in an amount of 0.05 wt % to 2 wt %, more preferably 0.05 wt % to 1 wt %. When using a solvent containing more than 2 wt % of water, it may be difficult to prepare a polyamic acid having a predetermined low molecular weight reproducibly, because the reaction of an acid anhydride group and an amino group proceeds more competitively to the reaction of an acid anhydride group and water. Furthermore, when the polyamic acid solution obtained contains a large amount of water, the solution stability may be deteriorated. In addition, it is undesirable to remove an excessive amount of water from the solution after the completion of the reaction. The removal of water must be conducted at a low temperature and under a reduced pressure for suppressing an excessive imidization reaction, leading to a more complicated process.

In the first step, a diamine component is reacted with an excessive molar amount of a tetracarboxylic acid component. The molar ratio of the tetracarboxylic acid component to the diamine component (the molar amount of the tetracarboxylic acid component/the molar amount of the diamine component) is preferably 1.2 or more, more preferably 1.5 or more, particularly preferably from about 1.5 to about 5.0. When the molar ratio is 2 or more, the tetracarboxylic acid component which is not reacted with the diamine component is mostly hydrolyzed by the action of water present in the solvent to be a tetracarboxylic acid, which coexists in the polyamic acid solution after the completion of the reaction. It does not cause any problems, as long as the tetracarboxylic acid is homogeneously dissolved in the solution.

Although the whole amount of the tetracarboxylic acid component to be used for the preparation of a polyamic acid solution may be added to the solvent for reaction in the first step, with no tetracarboxylic acid component added to the solution in the second step, the process in which only a diamine component is added to the solution in the second step may not be preferable in view of production. It is preferred that a part of the tetracarboxylic acid component to be used is added to the solvent for reaction in the first step, and then the diamine component and the tetracarboxylic acid component are added thereto for further reaction in the second step to prepare a polyamic acid solution. When only a diamine component is added to the solution for further reaction in the second step, the solution sometimes needs to be heated to a temperature at which an excessive imidization reaction may not be prevented, and a polyamic acid solution which is colored and/or has lower solution stability may be obtained.

In general, the amount of the tetracarboxylic acid component to be reacted in the first step is preferably from 10 mol % to 70 mol %, more preferably from 20 mol % to 50 mol %, based on the total amount of the tetracarboxylic acid component to be reacted in the first step and the second step. When the amount of the tetracarboxylic acid component used in the first step is out of the above range, the solution stability (viscosity stability) of the amic acid solution obtained may be deteriorated.

In addition, the solution viscosity of the polyamic acid obtained may be more suitably adjusted when using 2,3,3',4'-biphenyltetracarboxylic dianhydride in the first step and using 3,3',4,4'-biphenyltetracarboxylic dianhydride in the second step.

There are no particular restrictions to the reaction conditions in the first step, so long as a polyamic acid is formed by the addition reaction, while suppressing an excessive imidization reaction. The reaction is preferably conducted under atmospheric pressure, although the reaction may be conducted under an increased pressure or a reduced pressure. The reaction temperature is preferably 100° C. or lower, more preferably from 20° C. to 80° C. In the first step, the reaction is generally conducted for about 1 to 100 hours under the above temperature conditions. The reaction may be preferably conducted in an inert gas atmosphere such as in nitrogen atmosphere.

The logarithmic viscosity of the polyamic acid obtained in the first step is preferably 0.4 or lower, more preferably from 0.01 to 0.4, particularly preferably from 0.01 to 0.3, further preferably from 0.05 to 0.2. When the diamine component and the tetracarboxylic acid component are reacted in a nearly equimolar amount in the first step, the polyamic acid obtained may have a logarithmic viscosity of more than 0.4. In such cases, the diamine component and the tetracarboxylic acid component are reacted in a nearly equimolar amount in the second step, and therefore the polyamic acid obtained inevitably has a high molecular weight. In the case where a high-concentration solution is used for the reaction, when a polyamic acid is polymerized in the first step, the viscosity of the solution obtained in the first step may be significantly high, and in the second step, the reaction of the diamine component and the tetracarboxylic acid component which are added may not adequately proceed and these components may remain unreacted and undissolved in the polyamic acid solution.

In the second step in the process for producing a polyamic acid solution of the present invention, a diamine component, or a diamine component and a tetracarboxylic acid component are added to the polyamic acid solution obtained in the first step so that the total molar amount of the diamine component is substantially equal to the total molar amount of the tetracarboxylic acid component, preferably the molar ratio (tetracarboxylic acid component/diamine component) is within a range of about 1.05 to about 0.95. And then, the diamine component and the tetracarboxylic acid component are further reacted. In the second step, the reaction may be preferably conducted under the same conditions as in the first step as described above. Apart of the tetracarboxylic acid component (tetracarboxylic dianhydride) added in the second step may be replaced with a tetracarboxylic acid or a lower alcohol ester of a tetracarboxylic acid.

There may be preferably provided, at the end of the second step, an amic acid solution which contains an amic acid having a logarithmic viscosity of 0.4 or lower, preferably 0.35 or lower, more preferably from 0.01 to 0.35, more preferably from 0.05 to 0.35, particularly preferably from 0.05 to 0.3, further preferably from 0.05 to 0.25 with high reproducibility. In the amic acid solution, substantially all (90% or more, preferably 95% or more) of the acid anhydride groups derived from the tetracarboxylic dianhydride, which do not react with an amino group to form an amic acid bond, are hydrolyzed to be two carboxyl groups. Furthermore, the amic acid contained in the amic acid solution has a very low molecular weight. Accordingly, an increase in the solution viscosity may be reduced, and therefore the concentration of the amic acid in the amic acid solution obtained may be easily increased. Consequently, there may be preferably provided a high-concentration polyamic acid solution having a solid content concentration of 25 wt % or more, preferably from 25 wt % to 50 wt %, more preferably from 27 wt % to 50 wt %, particularly preferably from 30 wt % to 45 wt %. The high-concentration polyamic acid solution has a low viscosity, for example, a solution viscosity at 30° C. of 50 Pa·sec or lower, preferably from 0.5 Pa·sec to 50 Pa·sec, more preferably from 1 Pa·sec to 40 Pa·sec, particularly preferably from 1 Pa·sec to 10 Pa·sec. For this reason, the polyamic acid solution is practically very useful.

For the preparation of the polyamic acid solution, a solvent containing water in an amount of 0.05 wt % to 2 wt %, more preferably 0.05 wt % to 1 wt % is used in the first step. The water is consumed for the hydrolysis of the acid anhydride group in the tetracarboxylic acid component, and the residual water remains in the solution. As the solvent to be used contains a sufficiently small amount of water, there is no need to adjust the amount of water (remove water from the solution) after the completion of the reaction. Even when water is not removed from the solution, a polyamic acid solution having a water content of 1 wt % or less, for example, may be obtained. The polyamic acid solution contains a sufficiently small amount of water, as described above. Moreover, substantially all of the acid anhydride groups derived from the tetracarboxylic dianhydride are hydrolyzed to be two carboxyl groups, except the acid anhydride groups which react with an amino group to form an amic acid bond. Accordingly, every component in the polyamic acid solution is less likely to react at least when stored at a low temperature, and therefore the solution stability may be sufficiently high.

Although the polyamic acid solution of the present invention is very useful as a polyimide precursor solution having a high concentration and a low viscosity, the present invention is not limited to a high-concentration solution. The polyamic acid solution of the present invention may be suitably used at various concentrations in various applications as a polyimide precursor. The polyamic acid may be readily converted to a polyimide by a polymerization/imidization reaction according to a known method such as a thermal imidization by heat treatment accompanied by solvent removal and a chemical imidization, for example, by treatment with acetic anhydride accompanied by solvent removal.

The polyamic acid solution of the present invention contains a polyamic acid prepared from the specific combination of diamine component and tetracarboxylic acid component, and the molecular weight of the polyamic acid is suitably controlled to a desired low level. The polyamic acid solution of the present invention preferably has a high concentration and a low viscosity. More specifically, the polyamic acid solution of the present invention preferably has a logarithmic viscosity of 0.4 or lower, more preferably 0.3 or lower, particularly preferably 0.25 or lower, which means that the polyamic acid has a low molecular weight, and preferably has a solid content concentration of 25 wt % to 50 wt %, and preferably has a solution viscosity at 30° C. of 50 Pa·sec or lower, more preferably 10 Pa·sec or lower. Moreover, the polyamic acid solution may exhibit excellent solution stability and film-forming properties, although it has a high concentration and a low viscosity as described above. Accordingly, a polyimide film having excellent mechanical properties, particularly a polyimide film having a thickness of more than 40 μm and having excellent mechanical properties, may be easily produced from the polyamic acid solution of the present invention without any trouble such as powdering and foaming by a conventionally known method, for example, by applying the polyamic acid solution on a support; and then heating it.

A polyimide film having a tensile strength at break of 150 MPa or higher, more preferably 200 MPa or higher, particularly preferably 250 MPa or higher, a tensile elastic modulus of 3.0 GPa or higher, more preferably 3.5 GPa or higher, and a tensile elongation at break of 50% or higher may be easily produced from the polyamic acid solution of the present invention without any trouble.

In one embodiment, a polyamic acid solution which is prepared by reacting a diamine component consisting of 50 mol % of p-phenylenediamine and 50 mol % of 4,4'-diaminodiphenyl ether with a tetracarboxylic acid component consisting of 20 mol % of 2,3,3',4'-biphenyltetracarboxylic dianhydride and 80 mol % of 3,3',4,4'-biphenyltetracarboxylic dianhydride in a solvent may be excluded.

The polyamic acid solution of the present invention may be suitably used as a polyamic acid solution composition containing other components commonly used in a polyimide precursor composition such as an imidization catalyst, an inorganic filler, an organic filler, a reinforcing fiber, carbon black, an anti-foaming agent, a dye, and a pigment. In addition, the polyamic acid solution of the present invention may be suitably used for the formation of a film, particularly a relatively thick film or a film containing a relatively large amount of filler, for the production of a CCL in combination with a copper foil, and for the preparation of an adhesive composition, and an ink composition for a protective film, for example.

The polyamic acid solution of the present invention may have a low viscosity suitable for the production of a polyimide film, particularly a polyimide seamless belt. The polyamic acid solution of the present invention may also have a high concentration and contain a sufficiently small amount of solvent. Therefore, the polyamic acid solution of the present invention may be used to produce a polyimide film, particularly a polyimide seamless belt having excellent properties, with high productivity.

EXAMPLES

The present invention will be described in more detail with reference to Examples. However, the present invention is not limited to the following Examples.

There will be described the measurement methods used in the following Examples. With regard to the amount of water (the content of water and the water content), the amount of water in the solvent used for the reaction in the first step was expressed in terms of "content of water" which was calculated based on the amount of water added to the organic solvent (NMP), because the amount of water as an impurity in the organic solvent used was negligible. The amount of water in the polyamic acid solution obtained was expressed in terms of "water content" which was determined by the following measurement method.

Solid Content Concentration

A sample solution (the weight thereof is referred to as "w1") was heated at 120° C. for 10 min, at 250° C. for 10 min and then at 350° C. for 30 min in a hot air drier, and the weight after the heat treatment (referred to as "w2") was measured. A solid content concentration [wt %] was calculated by the following equation.

Solid content concentration=$(w2/w1) \times 100$

Logarithmic Viscosity

A sample solution was diluted to a concentration of 0.5 g/dL based on the solid content concentration (the solvent: NMP). The time of flow of the diluted solution ($T_1$) was measured at 30° C. using Cannon-Fenske No. 100. A logarithmic viscosity was calculated from $T_1$ and the time of flow of the blank NMP ($T_0$) by the following equation.

Logarithmic viscosity=$\{\ln(T_1/T_0)\}/0.5$

Solution Viscosity (Rotational Viscosity)

The solution viscosity was measured at 30° C. using Tokimec Inc., type E viscometer.

Water Content

The water content was measured by a water content measuring device (AQV-2000; manufactured by Hiranuma Sangyo Co., Ltd.) using a Karl Fischer reagent (HYDRANAL-Composite 5K; manufactured by Sigma-Aldrich Corp.).

Solution Stability

A sample solution was stored in an atmosphere at a temperature of 5° C. for one month, and then turbidity, and the presence or absence of phase separation and precipitation was evaluated by visual observation. A solution which was turbid or had a phase separation or a precipitation after storage was evaluated as x, and a solution which remained unchanged after storage was evaluated as ○.

Film-Forming Properties (State of Polyimide Film)

A sample solution was applied onto a glass substrate such that the thickness of the polyimide film obtained was 50 μm, and then it was heated at 120° C. for 30 min, at 150° C. for 10 min, at 200° C. for 10 min, at 250° C. for 10 min and at 350° C. for 10 min in a hot air drier for solvent removal and the polymerization/imidization reaction, to produce a polyimide film. The state of the polyimide film, i.e. the presence or absence of defect such as expansion, crack and powdering of the polyimide film, was evaluated by visual observation. A film in which no defect such as expansion, crack and powdering was observed was evaluated as ○, a film in which defects were observed in from about 20% to about 40% of the total surface area was evaluated as Δ, and a film in which defects were observed in more than 40% of the total surface area was evaluated as x.

Tensile Strength at Break

The tensile strength at break of the polyimide film produced as described above was measured in accordance with ASTM D882, using a tensile tester (RTC-1225A, manufactured by Orientec Co., Ltd.).

Tensile Elongation at Break

The tensile elongation at break of the polyimide film produced as described above was measured in accordance with ASTM D882, using a tensile tester (RTC-1225A, manufactured by Orientec Co., Ltd.).

Tensile Elastic Modulus

The tensile elastic modulus of the polyimide film produced as described above was measured in accordance with ASTM D882, using a tensile tester (RTC-1225A, manufactured by Orientec Co., Ltd.).

Abbreviations of compounds used in the following Examples are as follows:

s-BPDA: 3,3',4,4'-biphenyltetracarboxylic dianhydride,
a-BPDA: 2,3,3',4'-biphenyltetracarboxylic dianhydride,
ODA: 4,4'-diaminodiphenyl ether,
PPD: p-phenylenediamine,
NMP: N-methyl-2-pyrrolidone.

Example 1

In a 1 L separable flask equipped with a stirrer, a stirring blade, a reflux condenser and a nitrogen-gas inlet tube were placed 670.00 g of NMP, 4.24 g of water, 69.22 g of s-BPDA, 23.07 g of a-BPDA and 31.41 g of ODA (molar ratio of water [water/the acid component]: 3/4; content of water: 0.61 wt %; molar ratio of the acid component [the acid component/the diamine component]: 2/1). And then, the mixture was stirred at a reaction temperature of 70° C. for 3 hours for reaction. Subsequently, 67.86 g of PPD was dissolved in the reaction solution, and 138.44 g of s-BPDA was added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.24, a solution viscosity of 5.3 Pa·sec, a solid content concentration of 30.3 wt %, and a water content of 1 wt % or less. For this solution, the solution stability was evaluated as ○ and the film-forming properties were evaluated as ○. The results are shown in Table 1.

Example 2

In a 1 L separable flask equipped with a stirrer, a stirring blade, a reflux condenser and a nitrogen-gas inlet tube were placed 670.00 g of NMP, 4.15 g of water, 67.74 g of s-BPDA, 22.58 g of a-BPDA and 30.74 g of ODA (molar ratio of water [water/the acid component]: 3/4; content of water: 0.60 wt %; molar ratio of the acid component [the acid component/the diamine component]: 2/1). And then, the mixture was stirred at a reaction temperature of 70° C. for 3 hours for reaction. Subsequently, 15.37 g of ODA and 58.10 g of PPD were dissolved in the reaction solution, and 135.47 g of s-BPDA was added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.23, a solution viscosity of 5.1 Pa·sec, a solid content concentration of 30.4 wt %, and a water content of 1 wt % or less. For this solution, the solution stability was evaluated as ○ and the film-forming properties were evaluated as ○. The results are shown in Table 1.

Example 3

In a 1 L separable flask equipped with a stirrer, a stirring blade, a reflux condenser and a nitrogen-gas inlet tube were placed 670.00 g of NMP 4.24 g of water, 46.15 g of s-BPDA, 46.15 g of a-BPDA and 31.41 g of ODA (molar ratio of water [water/the acid component]: 3/4; content of water: 0.60 wt %; molar ratio of the acid component [the acid component/the diamine component]: 2/1). And then, the mixture was stirred at a reaction temperature of 70° C. for 3 hours for reaction. Subsequently, 67.86 g of PPD was dissolved in the reaction solution, and 138.44 g of s-BPDA was added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.25, a solution viscosity of 5.0 Pa·sec, a solid content concentration of 30.5 wt %, and a water content of 1 wt % or less. For this solution, the solution stability was evaluated as ○ and the film-forming properties were evaluated as ○. The results are shown in Table 1.

Example 4

In a 1 L separable flask equipped with a stirrer, a stirring blade, a reflux condenser and a nitrogen-gas inlet tube were placed 670.00 g of NMP 4.15 g of water, 45.16 g of s-BPDA, 45.16 g of a-BPDA and 30.74 g of ODA (molar ratio of water [water/the acid component]: 3/4; content of water: 0.60 wt %; molar ratio of the acid component [the acid component/the diamine component]: 2/1). And then, the mixture was stirred at a reaction temperature of 70° C. for 3 hours for reaction. Subsequently, 15.37 g of ODA and 58.10 g of PPD were dissolved in the reaction solution, and 135.47 g of s-BPDA was added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.25, a solution viscosity of 5.2 Pa·sec, a solid content concentration of 30.3 wt %, and a water content of 1 wt % or less. For this solution, the solution stability was evaluated as ○ and the film-forming properties were evaluated as ○. The results are shown in Table 1.

Example 5

In a 1 L separable flask equipped with a stirrer, a stirring blade, a reflux condenser and a nitrogen-gas inlet tube were placed 670.00 g of NMP, 3.98 g of water, 43.30 g of s-BPDA, 43.30 g of a-BPDA and 29.47 g of ODA (molar ratio of water [water/the acid component]: 3/4; content of water: 0.58 wt %; molar ratio of the acid component [the acid component/the diamine component]: 2/1). And then, the mixture was stirred at a reaction temperature of 70° C. for 3 hours for reaction. Subsequently, 44.21 g of ODA and 39.80 g of PPD were dissolved in the reaction solution, and 129.91 g of s-BPDA was added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.23, a solution viscosity of 5.5 Pa·sec, a solid content concentration of 30.3 wt %, and a water content of 1 wt % or less. For this solution, the solution stability was evaluated as ○ and the film-forming properties were evaluated as ○. The results are shown in Table 1.

Example 6

In a 1 L separable flask equipped with a stirrer, a stirring blade, a reflux condenser and a nitrogen-gas inlet tube were placed 670.00 g of NMP, 3.78 g of water, 41.19 g of s-BPDA, 41.19 g of a-BPDA and 28.03 g of ODA (molar ratio of water [water/the acid component]: 3/4; content of water: 0.56 wt %; molar ratio of the acid component [the acid component/the diamine component]: 2/1). And then, the mixture was stirred at a reaction temperature of 70° C. for 3 hours for reaction. Subsequently, 77.10 g of ODA and 18.93 g of PPD were dissolved in the reaction solution, and 123.57 g of s-BPDA was added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.24, a solution viscosity of 5.8 Pa·sec, a solid content concentration of 30.5 wt %, and a water content of 1 wt % or less. For this solution, the solution stability was evaluated as ○ and the film-forming properties were evaluated as ○. The results are shown in Table 1.

Example 7

In a 1 L separable flask equipped with a stirrer, a stirring blade, a reflux condenser and a nitrogen-gas inlet tube were placed 670.00 g of NMP, 4.24 g of water, 46.15 g of s-BPDA, 46.15 g of a-BPDA and 31.41 g of ODA (molar ratio of water [water/the acid component]: 3/4; content of water: 0.61 wt %; molar ratio of the acid component [the acid component/the diamine component]: 2/1). And then, the mixture was stirred at a reaction temperature of 70° C. for 3 hours for reaction. Subsequently, 67.86 g of PPD was dissolved in the reaction solution, and 23.07 g of a-BPDA and 115.37 g of s-BPDA were added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.25, a solution viscosity of 5.3 Pa·sec, a solid content concentration of 30.4 wt %, and a water content of 1 wt % or less. For this solution, the solution stability was evaluated as ○ and the film-forming properties were evaluated as ○. The results are shown in Table 1.

Example 8

In a 1 L separable flask equipped with a stirrer, a stirring blade, a reflux condenser and a nitrogen-gas inlet tube were placed 670.00 g of NMP, 3.98 g of water, 43.30 g of s-BPDA, 43.30 g of a-BPDA and 29.47 g of ODA (molar ratio of water [water/the acid component]: 3/4; content of water: 0.58 wt %; molar ratio of the acid component [the acid component/the diamine component]: 2/1). And then, the mixture was stirred at a reaction temperature of 70° C. for 3 hours for reaction. Subsequently, 44.21 g of ODA and 39.80 g of PPD were dissolved in the reaction solution, and 64.96 g of a-BPDA and 64.96 g of s-BPDA were added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.24, a solution viscosity of 5.4 Pa·sec, a solid content concentration of 30.5 wt %, and a water content of 1 wt % or less. For this solution, the solution stability was evaluated as ○ and the film-forming properties were evaluated as ○. The results are shown in Table 1.

Example 9

In a 1 L separable flask equipped with a stirrer, a stirring blade, a reflux condenser and a nitrogen-gas inlet tube were placed 670.00 g of NMP, 4.06 g of water, 44.21 g of s-BPDA, 44.21 g of a-BPDA and 30.09 g of ODA (molar ratio of water [water/the acid component]: 3/4; content of water: 0.59 wt %; molar ratio of the acid component [the acid component/the diamine component]: 2/1). And then, the mixture was stirred at a reaction temperature of 70° C. for 3 hours for reaction. Subsequently, 30.09 g of ODA and 48.76 g of PPD were dissolved in the reaction solution, and 88.42 g of a-BPDA and 44.21 g of s-BPDA were added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.23, a solution viscosity of 5.1 Pa·sec, a solid content concentration of 30.3 wt %, and a water content of 1 wt % or less. For this solution, the solution stability was evaluated as ○ and the film-forming properties were evaluated as ○. The results are shown in Table 1.

Example 10

In a 1 L separable flask equipped with a stirrer, a stirring blade, a reflux condenser and a nitrogen-gas inlet tube were placed 670.00 g of NMP, 3.90 g of water, 42.43 g of s-BPDA, 42.43 g of a-BPDA and 28.88 g of ODA (molar ratio of water [water/the acid component]: 3/4; content of water: 0.57 wt %; molar ratio of the acid component [the acid component/the diamine component]: 2/1). And then, the mixture was stirred at a reaction temperature of 70° C. for 3 hours for reaction. Subsequently, 57.76 g of ODA and 31.20 g of PPD were dissolved in the reaction solution, and 84.86 g of a-BPDA and 42.43 g of s-BPDA were added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.24, a solution viscosity of 5.3 Pa·sec, a solid content concentration of 30.4 wt %, and a water content of 1 wt % or less. For this solution, the solution stability was evaluated as ○ and the film-forming properties were evaluated as ○. The results are shown in Table 1.

Comparative Example 1

In a 1 L separable flask equipped with a stirrer, a stirring blade, a reflux condenser and a nitrogen-gas inlet tube were placed 670.00 g of NMP 4.43 g of water, 96.52 g of s-BPDA and 17.74 g of PPD (molar ratio of water [water/the acid component]: 3/4; content of water: 0.65 wt %; molar ratio of the acid component [the acid component/the diamine component]: 2/1). And then, the mixture was stirred at a reaction temperature of 70° C. for 3 hours for reaction. Subsequently, 70.96 g of PPD was dissolved in the reaction solution, and 144.78 g of s-BPDA was added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.24, a solution viscosity of 19.0 Pa·sec, a solid content concentration of 30.8 wt %, and a water content of 1 wt % or less. For this solution, the solution stability was evaluated as ○, but a polyimide film could not be produced from the polyamic acid solution owing to the occurrence of cracks during production. The results are shown in Table 2.

Comparative Example 2

In a 1 L separable flask equipped with a stirrer, a stirring blade, a reflux condenser and a nitrogen-gas inlet tube were placed 670.00 g of NMP, 4.33 g of water, 70.77 g of s-BPDA, 23.59 g of a-BPDA, 16.06 g of ODA and 8.67 g of PPD (molar ratio of water [water/the acid component]: 3/4; content of water: 0.63 wt %; molar ratio of the acid component [the acid component/the diamine component]: 2/1). And then, the mixture was stirred at a reaction temperature of 70° C. for 3 hours for reaction. Subsequently, 69.38 g of PPD was dissolved in the reaction solution, and 141.54 g of s-BPDA was added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.25, a solution viscosity of 6.0 Pa·sec, a solid content concentration of 30.5 wt %, and a water content of 1 wt % or less. For this solution, the solution stability was evaluated as ○, but a polyimide film could not be produced from the polyamic acid solution owing to the occurrence of foaming during production. The results are shown in Table 2.

Comparative Example 3

In a 1 L separable flask equipped with a stirrer, a stirring blade, a reflux condenser and a nitrogen-gas inlet tube were placed 670.00 g of NMP, 4.15 g of water, 45.16 g of s-BPDA, 45.16 g of a-BPDA and 30.74 g of ODA (molar ratio of water [water/the acid component]: 3/4; content of water: 0.60 wt %; molar ratio of the acid component [the acid component/the diamine component]: 2/1). And then, the mixture was stirred at a reaction temperature of 70° C. for 3 hours for reaction. Subsequently, 15.37 g of ODA and 58.10 g of PPD were dissolved in the reaction solution, and 112.90 g of a-BPDA and 22.57 g of s-BPDA were added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.24, a solution viscosity of 5.7 Pa·sec, a solid content concentration of 30.7 wt %, and a water content of 1 wt % or less. For this solution, the solution stability was evaluated as x and the film-forming properties were evaluated as Δ. The results are shown in Table 2.

Comparative Example 4

In a 1 L separable flask equipped with a stirrer, a stirring blade, a reflux condenser and a nitrogen-gas inlet tube were placed 670.00 g of NMP, 3.82 g of water, 41.59 g of s-BPDA, 41.59 g of a-BPDA and 28.31 g of ODA (molar ratio of water [water/the acid component]: 3/4; content of water: 0.56 wt %; molar ratio of the acid component [the acid component/the diamine component]: 2/1). And then, the mixture was stirred at a reaction temperature of 70° C. for 3 hours for reaction. Subsequently, 70.78 g of ODA and 22.94 g of PPD were dissolved in the reaction solution, and 103.99 g of a-BPDA and 20.80 g of s-BPDA were added. Then, the mixture was stirred at a reaction temperature of 50° C. for 20 hours for reaction. The amount of the tetracarboxylic acid component to be reacted in the first step was 40 mol % based on the total amount of the tetracarboxylic acid component to be reacted in the first step and the second step.

The resulting reaction solution had a logarithmic viscosity of 0.27, a solution viscosity of 5.8 Pa·sec, a solid content concentration of 30.3 wt %, and a water content of 1 wt % or less. For this solution, the solution stability was evaluated as x and the film-forming properties were evaluated as Δ. The results are shown in Table 2.

TABLE 1

| | | Example 1 | Example 2 | Example 3 | Example 4 | Example 5 | Example 6 |
|---|---|---|---|---|---|---|---|
| composition of polyamic acid | | | | | | | |
| acid component | s-BPDA (mol %) | 90 | 90 | 80 | 80 | 80 | 80 |
| | a-BPDA (mol %) | 10 | 10 | 20 | 20 | 20 | 20 |
| diamine component | PPD (mol %) | 80 | 70 | 80 | 70 | 50 | 25 |
| | ODA (mol %) | 20 | 30 | 20 | 30 | 50 | 75 |
| polyamic acid solution composition | | | | | | | |
| | logarithmic viscosity | 0.24 | 0.23 | 0.25 | 0.25 | 0.23 | 0.24 |
| | solid content concentration (wt %) | 30.3 | 30.4 | 30.5 | 30.3 | 30.3 | 30.5 |
| | solution viscosity (Pa·s) | 5.3 | 5.1 | 5.0 | 5.2 | 5.5 | 5.8 |
| | solution stability | ○ | ○ | ○ | ○ | ○ | ○ |
| polyimide film | | | | | | | |
| | film thickness (μm) | 50 | 50 | 50 | 50 | 50 | 50 |
| | tensile strength at break (MPa) | 351 | 363 | 295 | 245 | 260 | 214 |
| | tensile elongation at break (%) | 60 | 73 | 55 | 58 | 83 | 84 |
| | tensile elastic modulus (GPa) | 5.7 | 4.9 | 4.9 | 4.4 | 4.2 | 3.8 |
| | state of polyimide film | ○ | ○ | ○ | ○ | ○ | ○ |

| | | Example 7 | Example 8 | Example 9 | Example 10 |
|---|---|---|---|---|---|
| composition of polyamic acid | | | | | |
| acid component | s-BPDA (mol %) | 70 | 50 | 40 | 40 |
| | a-BPDA (mol %) | 30 | 50 | 60 | 60 |
| diamine component | PPD (mol %) | 80 | 50 | 60 | 40 |
| | ODA (mol %) | 20 | 50 | 40 | 60 |
| polyamic acid solution composition | | | | | |
| | logarithmic viscosity | 0.25 | 0.24 | 0.23 | 0.24 |
| | solid content concentration (wt %) | 30.4 | 30.5 | 30.3 | 30.4 |
| | solution viscosity (Pa·s) | 5.3 | 5.4 | 5.1 | 5.3 |
| | solution stability | ○ | ○ | ○ | ○ |

TABLE 1-continued

| polyimide film | | | | |
|---|---|---|---|---|
| film thickness (μm) | 50 | 50 | 50 | 50 |
| tensile strength at break (MPa) | 244 | 154 | 154 | 151 |
| tensile elongation at break (%) | 67 | 78 | 80 | 91 |
| tensile elastic modulus (GPa) | 4.2 | 3.0 | 3.0 | 3.0 |
| state of polyimide film | ○ | ○ | ○ | ○ |

TABLE 2

| | | Comp. Example 1 | Comp. Example 2 | Comp. Example 3 | Comp. Example 4 |
|---|---|---|---|---|---|
| composition of polyamic acid | | | | | |
| acid component | s-BPDA (mol %) | 100 | 90 | 30 | 30 |
| | a-BPDA (mol %) | | 10 | 70 | 70 |
| diamine component | PPD (mol %) | 100 | 90 | 70 | 30 |
| | ODA (mol %) | | 10 | 30 | 70 |
| polyamic acid solution composition | | | | | |
| logarithmic viscosity | | 0.24 | 0.25 | 0.24 | 0.27 |
| solid content concentration (wt %) | | 30.8 | 30.5 | 30.7 | 30.3 |
| solution viscosity (Pa·s) | | 19.0 | 6.0 | 5.7 | 5.8 |
| solution stability | | ○ | ○ | x | x |
| polyimide film | | | | | |
| film thickness (μm) | | Sample could not be obtained owing to cracks. | Sample could not be obtained owing to foaming. | 50 | 50 |
| tensile strength at break (MPa) | | | | 129 | 129 |
| tensile elongation at break (%) | | | | 63 | 71 |
| tensile elastic modulus (GPa) | | | | 3.1 | 2.9 |
| state of polyimide film | | x | x | Δ | Δ |

Comparative Example 5

In a 1 L separable flask equipped with a stirrer, a stirring blade, a reflux condenser and a nitrogen-gas inlet tube were placed 670.00 g of NMP, 13.26 g of water, 173.21 g of s-BPDA, 43.30 g of a-BPDA, 39.80 g of PPD and 73.69 g of ODA (molar ratio of water [water/the acid component]: 1/1; content of water: 1.92 wt %; molar ratio of the acid component [the acid component/the diamine component]: 1). And then, the mixture was stirred at a reaction temperature of 50° C. for 15 hours for reaction.

The resulting reaction solution had a logarithmic viscosity of 0.995, a solution viscosity of 1,000 Pa·sec or higher, and a solid content concentration of 30.2 wt %. In the test for the film-forming properties, this solution was not easily cast due to its higher solution viscosity, and a uniform coating film could not be obtained.

Comparative Example 6

In a 5 L separable flask equipped with a stirrer, a stirring blade, a reflux condenser and a nitrogen-gas inlet tube were placed 3399.27 g of NMP, 11.89 g of water, 582.56 g of s-BPDA and 198.26 g of ODA (molar ratio of water [water/the acid component]: 1/3; content of water: 0.28 wt %; molar ratio of the acid component [the acid component/the diamine component]: 2). And then, the mixture was stirred at a reaction temperature of 50° C. for 15 hours for reaction. Subsequently, 178.46 g of PPD and 132.17 g of ODA were dissolved in the reaction solution, and 194.18 g of s-BPDA and 194.19 g of a-BPDA were added. Then, the mixture was stirred at a reaction temperature of 50° C. for 25 hours for reaction, but the tetracarboxylic dianhydride component added was not dissolved in the reaction solution, and a polyamic acid solution could not be obtained.

Comparative Example 7

In a 5 L separable flask equipped with a stirrer, a stirring blade, a reflux condenser and a nitrogen-gas inlet tube were placed 1343.75 g of NMP, 280.45 g of s-BPDA, 76.50 g of a-BPDA, 70.30 g of PPD and 130.17 g of ODA (molar ratio of the acid component [the acid component/the diamine component]: 0.93). And then, the mixture was stirred at a reaction temperature of 50° C. for 15 hours for reaction.

The resulting reaction solution had a higher viscosity, specifically, a logarithmic viscosity of 0.41, and a solution viscosity of 49.5 Pa·sec. To the reaction solution was added 31.75 g of BPTA so that the molar ratio of the total acid component [the acid component/the diamine component] is 1, but BPTA was not dissolved in the reaction solution, and a homogeneous polyamic acid solution could not be obtained.

INDUSTRIAL APPLICABILITY

According to the present invention, there may be provided a process for producing a polyamic acid solution having a high concentration and a low viscosity reproducibly and reliably, while controlling the molecular weight of the polyamic acid, which is prepared from the specific combination of diamine component and tetracarboxylic acid component, to a predetermined low level. Furthermore, according to the present invention, there may be provided a novel polyamic acid solution having a polyamic acid logarithmic viscosity of 0.4 or lower. This polyamic acid solution may have a high concentration and a low viscosity, and exhibit excellent solution stability and film-forming properties. A polyimide film having excellent mechanical properties may be easily prepared from the polyamic acid solution.

The invention claimed is:

1. A process for producing a polyamic acid solution by reacting a diamine component consisting of 20 mol % to 80 mol % of p-phenylenediamine and 80 mol % to 20 mol % of diaminodiphenyl ether with a tetracarboxylic acid component consisting of 10 mol % to 60 mol % of 2,3,3',4'-biphenyltetracarboxylic dianhydride and 90 mol % to 40 mol % of 3,3',4,4'-biphenyltetracarboxylic dianhydride in a solvent, comprising:

a first step in which a diamine component is reacted with a molar excess of a tetracarboxylic acid component in a solvent containing more than ⅓ mole of water per mole of the tetracarboxylic acid component, whereby preparing a polyamic acid solution in which an acid anhydride group derived from the tetracarboxylic dianhydride as the tetracarboxylic acid component at the polyamic acid molecular terminal is hydrolyzed to be two carboxyl groups; and a second step in which a diamine component and a tetracarboxylic acid component are added to the polyamic acid solution obtained in the first step so that the molar amount of the diamine component is substantially equal to the molar amount of the tetracarboxylic acid component, and then the diamine component and the tetracarboxylic acid component are reacted, thereby preparing a homogeneous polyamic acid solution having a polyamic acid logarithmic viscosity of 0.35 or lower, a solid content concentration of 25 wt % to 50 wt %, and a water content of 1 wt % or less, wherein the amount of the tetracarboxylic acid component reacted in the first step is within a range of 10 mol % to 70 mol % based on the total amount of the tetracarboxylic acid component reacted in the first step and the second step.

2. The process for producing a polyamic acid solution as claimed in claim 1, wherein, the molar ratio of the tetracarboxylic acid component to the diamine component (tetracarboxylic acid component/diamine component) reacted in the first step is 1.2 or more.

3. The process for producing a polyamic acid solution as claimed in claim 1, wherein, the content of water in the solvent used in the first step is within a range of 0.05 wt % to 2 wt %.

4. The process for producing a polyamic acid solution as claimed in claim 1, wherein the polyamic acid solution obtained in the second step has a solution viscosity at 30° C. of 50 Pa·sec or lower.

5. The process for producing a polyamic acid solution as claimed in claim 3, wherein water is not removed from the solution after completion of the reaction to achieve the water content of 1 wt % or less.

* * * * *